(12) United States Patent
Civiero

(10) Patent No.: US 11,592,097 B2
(45) Date of Patent: Feb. 28, 2023

(54) SUB-ASSEMBLY SPROCKET-CARRYING BODY AND COGSET FOR A BICYCLE REAR WHEEL, RING NUT FOR FIXING SUCH A SUB-ASSEMBLY AND METHOD FOR FIXING A COGSET TO A SPROCKET-CARRYING BODY

(71) Applicant: CAMPAGNOLO S.r.l., Vicenza (IT)

(72) Inventor: Mirco Civiero, Montecchia di Crosara (IT)

(73) Assignee: CAMPAGNOLO S.r.l., Vicenza (IT)

( * ) Notice: Subject to any disclaimer, the term of this patent is extended or adjusted under 35 U.S.C. 154(b) by 263 days.

(21) Appl. No.: 17/086,999

(22) Filed: Nov. 2, 2020

(65) Prior Publication Data
US 2021/0131547 A1 May 6, 2021

(30) Foreign Application Priority Data

Nov. 6, 2019 (IT) .................... 102019000020502

(51) Int. Cl.
*F16H 55/12* (2006.01)
*B62M 9/12* (2006.01)
(Continued)

(52) U.S. Cl.
CPC ............... *F16H 55/12* (2013.01); *B62M 9/12* (2013.01); *F16B 37/0892* (2013.01); *F16H 55/30* (2013.01)

(58) Field of Classification Search
CPC ...... F16H 55/12; F16H 55/30; F16B 37/0892; B62M 9/12
(Continued)

(56) References Cited

U.S. PATENT DOCUMENTS

| 4,353,447 | A | * | 10/1982 | Bes | .......................... | B62M 9/10 |
| | | | | | | 192/64 |
| 2013/0017914 | A1 | * | 1/2013 | Braedt | ...................... | B62M 9/10 |
| | | | | | | 403/299 |

(Continued)

FOREIGN PATENT DOCUMENTS

| CN | 108 482 572 A | | 9/2018 | | |
| CN | 108482572 | * | 9/2018 | .............. | B62M 9/10 |

(Continued)

OTHER PUBLICATIONS

European Search Report for App. No. 20205224.7, dated Mar. 10, 2021.

(Continued)

*Primary Examiner* — Gene O Crawford
*Assistant Examiner* — Emily R Kincaid
(74) *Attorney, Agent, or Firm* — Volpe Koenig

(57) ABSTRACT

A bicycle rear wheel sub-assembly having a sprocket-carrying body, a cogset including a plurality of axially adjacent sprockets with at least three of the plurality of sprockets formed into a monolithic set and a ring nut securing the cogset to the sprocket-carrying body. The ring nut is formed as two parts assembled together—an axially outer first part on which a tubular body and a flange are formed, and an axially inner second part on which a threaded portion is formed. This structure provides a simple and effective coupling of the ring nut with the monolithic sub-set of the cogset and the sprocket-carrying body.

15 Claims, 5 Drawing Sheets

(51) Int. Cl.
*F16H 55/30* (2006.01)
*F16B 37/08* (2006.01)

(58) Field of Classification Search
USPC .......................................... 474/160
See application file for complete search history.

(56) References Cited

U.S. PATENT DOCUMENTS

| | | | |
|---|---|---|---|
| 2015/0024884 A1* | 1/2015 | Braedt | F16H 9/24 474/78 |
| 2017/0021667 A1* | 1/2017 | Chen | F16H 55/12 |
| 2019/0127022 A1 | 5/2019 | Komatsu et al. | |

FOREIGN PATENT DOCUMENTS

| | | |
|---|---|---|
| EP | 2 546 135 A2 | 1/2013 |
| EP | 3 109 062 A1 | 12/2016 |

OTHER PUBLICATIONS

Italian Search Report and Written Opinion in Italian Application No. 102019000020502, dated Nov. 6, 2019 with English translation.

\* cited by examiner

SUB-ASSEMBLY SPROCKET-CARRYING BODY AND COGSET FOR A BICYCLE REAR WHEEL, RING NUT FOR FIXING SUCH A SUB-ASSEMBLY AND METHOD FOR FIXING A COGSET TO A SPROCKET-CARRYING BODY

CROSS REFERENCE TO RELATED APPLICATION(S)

This application claims the benefit of Italian Application No. 102019000020502, filed on Nov. 6, 2019 which is incorporated herein by reference as if fully set forth.

FIELD OF INVENTION

The present invention relates to a sub-assembly for a bicycle rear wheel, formed from a sprocket-carrying body and a cogset coaxially mounted on the sprocket-carrying body through shape engagement of the cogset on a coupling profile formed on the radially peripheral surface of the sprocket-carrying body and extending in the axial direction. The invention also relates to a ring nut for fixing such a sub-assembly and a method for fixing a cogset to a sprocket-carrying body.

BACKGROUND

In the entire present description and in the claims, the spatial indications, such as in particular those of radial, axial and circumferential direction, will be given with reference to the rotation axis of the rear wheel of the bicycle, which coincides with the axis of the cogset, of the sprocket-carrying body, of the hub of the wheel and in general of all of the elements that rotate with the wheel. Moreover, the axial direction will be indicated as towards the outside if directed away from the longitudinal mid-plane of the bicycle or away from the hub of the wheel, and vice-versa as towards the inside if directed towards such a mid-plane or towards the hub. The brief indications outer and inner (or axially outer and axially inner) will be used in the same way: outer is thus equivalent to facing in the outer axial direction and inner is equivalent to facing in the inner axial direction. In the radial direction, the direction going away from the rotation axis will be indicated as peripheral and the opposite direction, towards the rotation axis, will be indicated as inner.

In order to mount a cogset on the hub of a bicycle rear wheel a so-called sprocket-carrying body is normally used, which on one side is made to rotate as a unit with the sprockets through shape coupling, and on the other side is made to rotate as a unit—but in a unidirectional manner—with the hub through a set of ratchets or similar, commonly called free wheel. In this way, the transmission chain engaged with the various sprockets is able to transmit a torque to the hub in the advancing direction of the bicycle.

The sprocket-carrying body essentially consists of a tubular body, which is mechanically coupled at the radially peripheral surface thereof with central mounting openings made in the sprockets. The radially peripheral surface of the sprocket-carrying body is shaped with a coupling profile (often formed from substantially axial ribs and grooves, alternating in the circumferential direction), adapted for allowing the aforementioned shape coupling. For this purpose, the central mounting openings of the sprockets are provided with extensions or projections directed radially towards the rotation axis, which couple with the coupling profile present on the sprocket-carrying body.

The sprockets are thus mounted axially on the sprocket-carrying body in succession, from the sprocket having the largest diameter, so that when the sprocket-carrying body is mounted on the hub of the wheel of the bicycle the sprockets having the largest diameter are located towards the inside, i.e. close to the rear wheel, whereas the sprockets having the smallest diameter are located towards the outside.

In more modern bicycle gearshifts, particularly for bicycles intended for competition, there is a well-known trend to increase the number of sprockets. When a cogset reaches 11, 12 or even more sprockets, it may be possible to do without the front gearshift; this simplifies and lightens the bicycle, which is undoubtedly appreciated by the cyclist provided that it is not accompanied by a penalization in the availability of gear ratios.

In order to allow this result, it is necessary to have a small sprocket with a very low number of teeth, for example 10 or 9, in the cogset. The reduced number of teeth, however, is clearly accompanied by a reduced diameter, which can end up being too small to allow it to be mounted on normal sprocket-carrying bodies. Cogsets have thus become established in which the smallest sprockets (typically the first three) are made fixedly connected to one another to form a monolithic set (commonly also called triplet, precisely because it groups together three sprockets), and the central opening for mounting on the sprocket-carrying body extends axially only at the largest sprocket of the set; the smallest sprockets extend more towards the rotation axis, but do not engage with the sprocket-carrying body, since it is ensured that they are set in motion by the fact that they are fixedly connected with the largest sprocket of the set.

The assembly of the sprockets and the monolithic set is blocked in the axial direction on the sprocket-carrying body by a fixing element, commonly called ring nut, which has a tubular body with a radially peripheral flange at the axially outer end of the ring nut: whereas the flange abuts on the axially outer face of the monolithic set, the tubular body is axially inserted in the monolithic set, towards the sprocket-carrying body; the tubular body is provided with a radially peripheral threading at the axially inner end of the ring nut and with such a threading it is screwed to a corresponding threading on the sprocket-carrying body.

When the monolithic set comprises a smaller sprocket with 9 or less teeth, the inner diameter thereof (at the smallest sprocket) is so small that the tubular body of the ring nut can only insert therein provided that it has a very small diameter. By doing so, however, the diameter of the tubular body of the ring nut is too small to allow the screwing engagement between the ring nut and the sprocket-carrying body. In order to avoid the problem, it is theoretically possible to think about a significant thickening of the sprocket-carrying body, which would however determine both an increase in the weight of the sub-assembly, and difficulty (if not actual impossibility) of coupling with the pin of the hub. It is also possible to adopt fixing systems different from the ring nut, which are not very popular because they are structurally and functionally more complex.

The problem at the basis of the present invention is to allow simple and secure fixing of the monolithic set to the sprocket-carrying body, without a significant increase in weight.

SUMMARY

The proposed solution to the problem is a sub-assembly having a sprocket-carrying body, with a radially inner threaded portion at an axially outer end thereof, that carries a cogset of a plurality of axially adjacent sprockets where a number of sprockets are fixed together to form a monolithic set having an axial through opening. The monolithic set is fixed to the sprocket-carrying body in the axial directions with a ring nut that is free to rotate with respect to the monolithic set. The ring nut has a flange that is radially peripheral at an axially outer end of the ring nut and a radially peripheral threaded portion at an axially inner end of the ring nut. The ring nut flange abuts against an axially outer face of the monolithic set and the threaded portion of the ring nut has a larger diameter than the minimum diameter of the axial through opening of the monolithic set.

BRIEF DESCRIPTION OF THE DRAWINGS

Further features and advantages of the invention will become clearer from the following detailed description of a sub-assembly according to an embodiment of the invention, made with reference to the attached drawings. In the drawings.

DETAILED DESCRIPTION OF THE PREFERRED EMBODIMENTS

Figure 1:
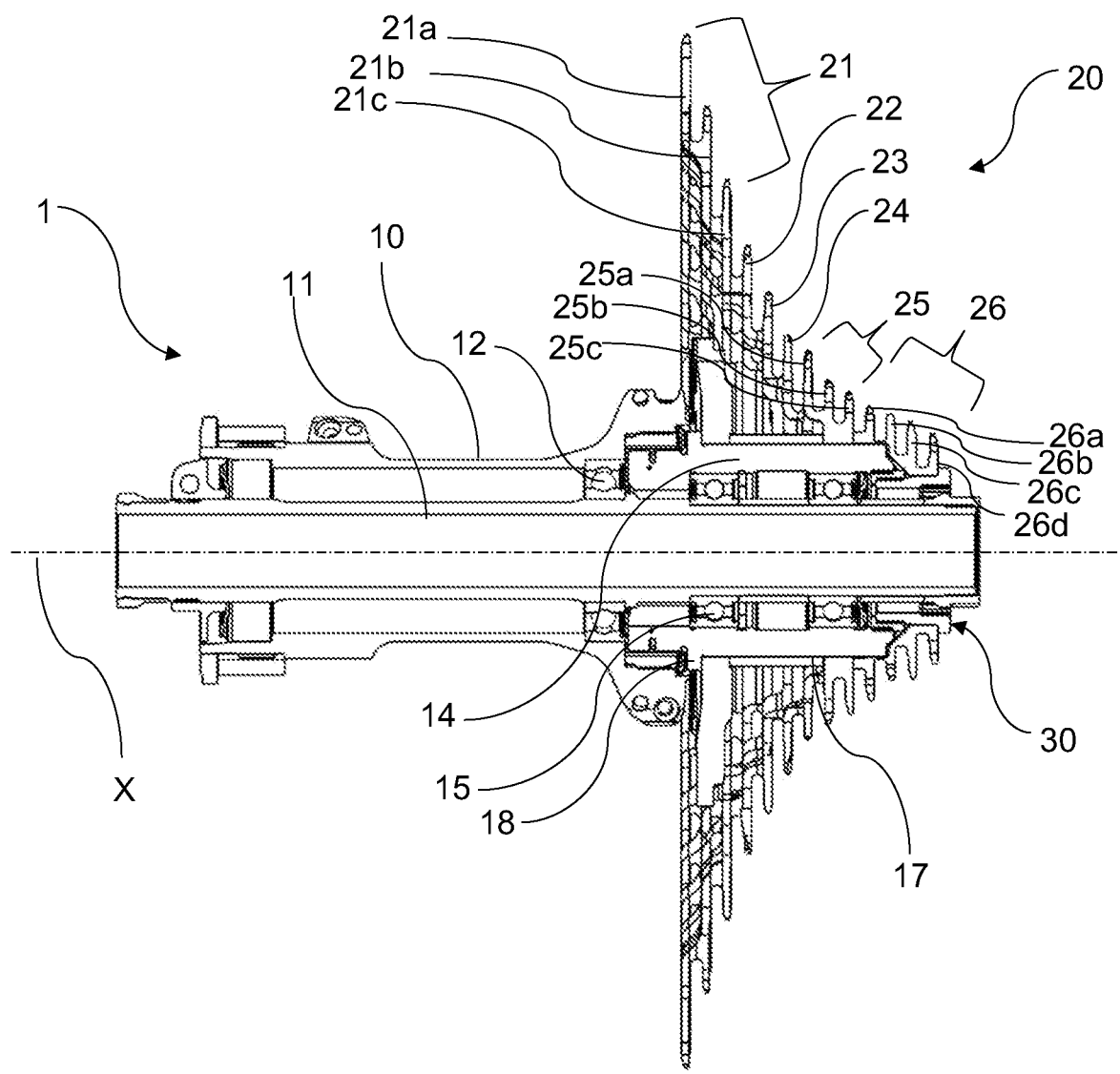
FIG. 1 is a section view of a hub group of a bicycle rear wheel, with a sub-assembly according to the invention.
Figure 2:
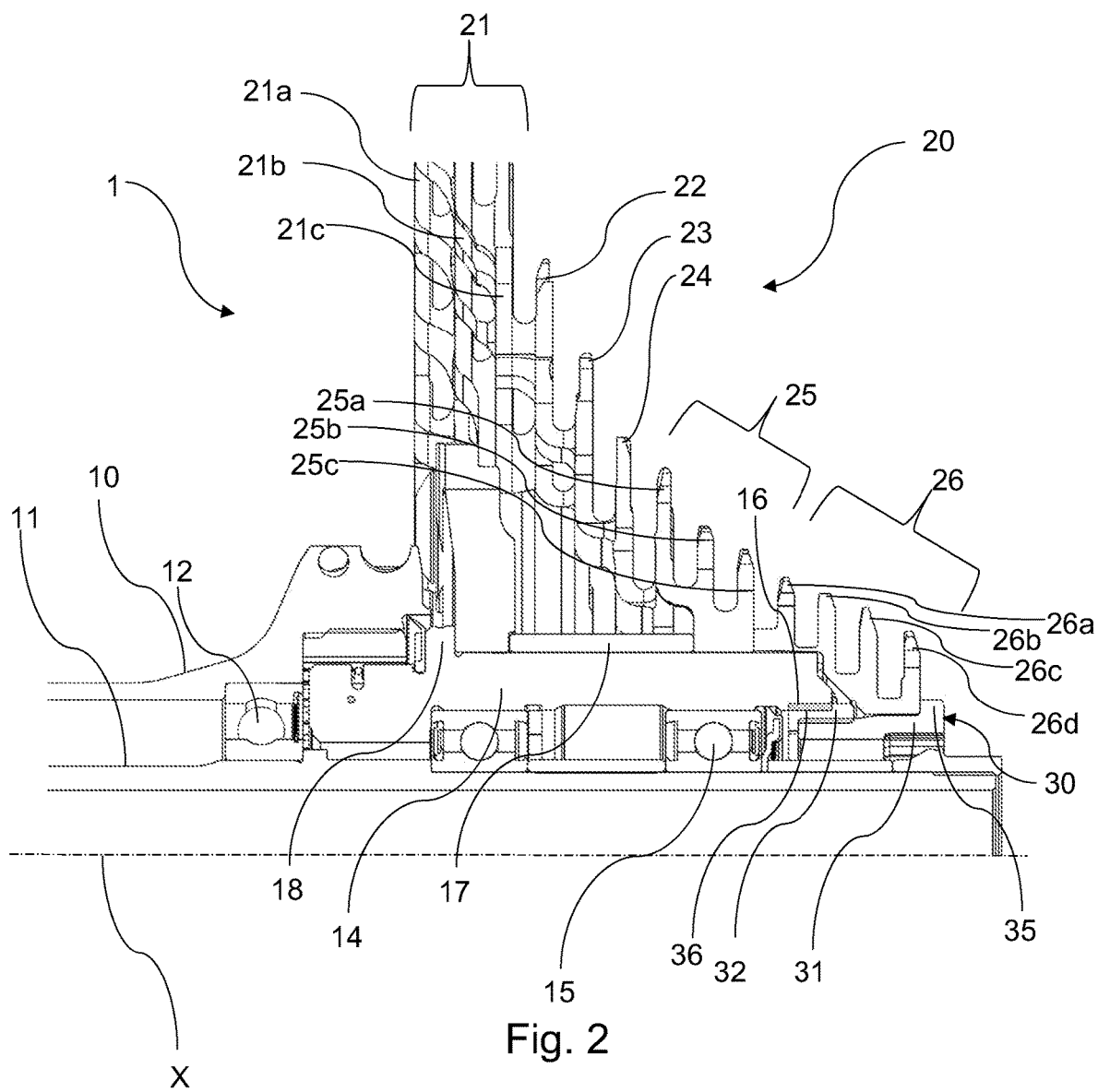
FIG. 2 is an enlarged section view of the hub group of FIG. 1.
Figure 3:
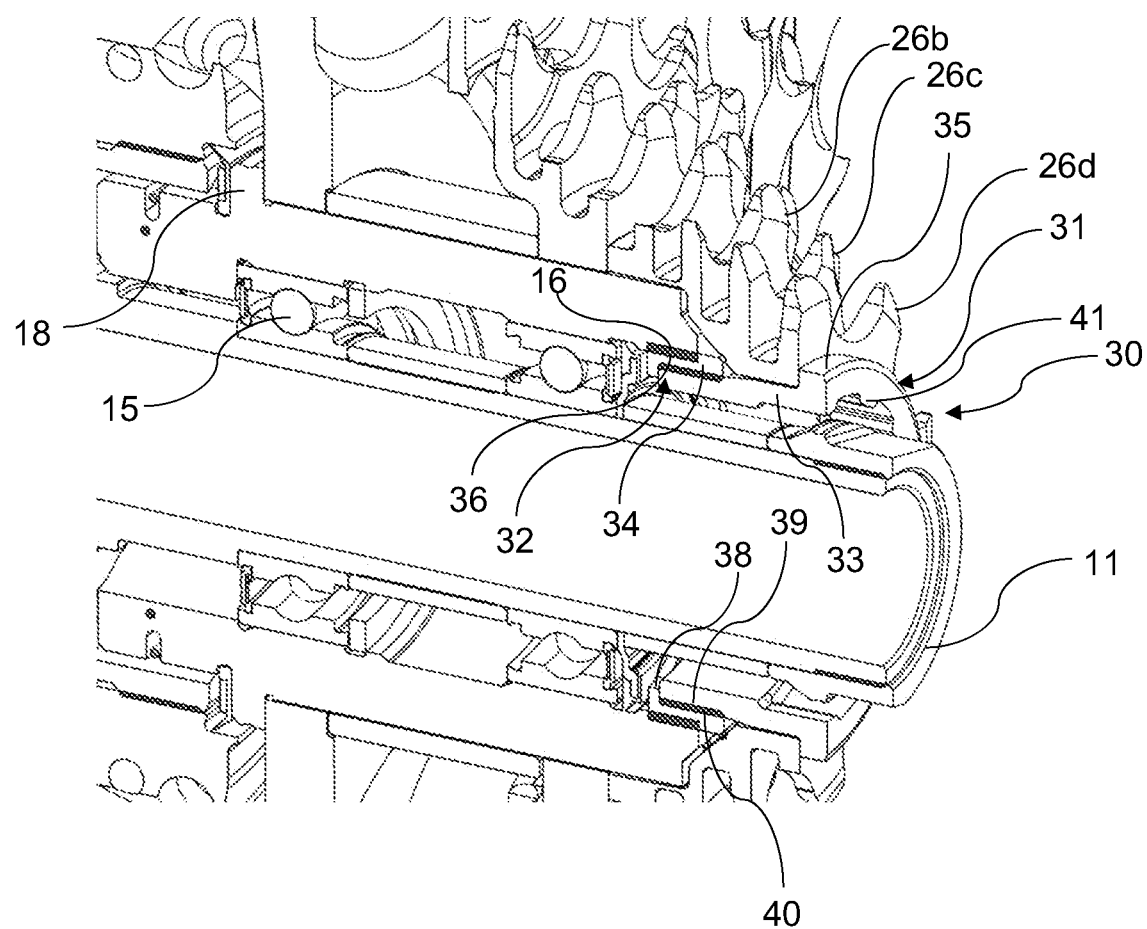
FIG. 3 is a perspective section view of the hub group of FIG. 1.

In a first aspect, the sub-assembly for a bicycle rear wheel, comprises:

a sprocket-carrying body equipped with a radially inner threaded portion at an axially outer end thereof; a cogset coaxially mounted on the sprocket-carrying body, wherein the cogset comprises a plurality of axially adjacent sprockets between a first sprocket having minimum number of teeth and a last sprocket having maximum number of teeth, wherein at least the first three sprockets are fixedly connected to one another so as to form a monolithic set with an axial through opening in which—in at least one axially inner portion thereof—a coupling profile is formed in shape engagement on a corresponding coupling profile formed on a radially peripheral surface of the sprocket-carrying body; a fixing element for axially fixing the monolithic set to the sprocket-carrying body, said fixing element comprising a ring nut constrained to the monolithic set only in the axial direction, wherein the ring nut is free to rotate with respect to the monolithic set and comprises a radially peripheral flange at an axially outer end of the ring nut, and a radially peripheral threaded portion at an axially inner end of the ring nut, in screwing engagement with the radially inner threaded portion of the sprocket-carrying body, wherein the flange abuts against an axially outer face of the monolithic set and the threaded portion has a greater diameter than the minimum diameter of the axial through opening of the monolithic set.

The ring nut thus constrained to the monolithic set makes it possible to overcome the problem of the diameter illustrated above, because it does not have to be inserted through the axial through opening of the monolithic set, after it has been mounted on the sprocket-carrying body; the ring nut is indeed already positioned on the monolithic set so as to be able to be screwed to the sprocket-carrying body, thus axially locking the monolithic set on the sprocket-carrying body, together with all of the sprockets.

Preferably, the ring nut is formed in two parts assembled together, an axially outer first part on which the flange is formed and an axially inner second part on which the threaded portion of the ring nut is formed. The structure in two parts allows a simple and effective coupling of the ring nut with the monolithic set: the two parts are partially inserted in the axial through opening of the monolithic set from opposite directions and are coupled by closing together the monolithic set.

Preferably, the first and the second part of the ring nut are screwed together. This coupling is simple to make and to use, and ensures excellent stability.

Preferably, the second part comprises, on an axially inner face thereof, a coupling profile to a tightening tool, more preferably a hexagonal opening. The maneuvering of the second part of the ring nut is thus made easier, even when it is substantially surrounded by the monolithic set.

Preferably, the first part of the ring nut comprises a radially peripheral threaded portion formed at an axially inner end of the first part of the ring nut, and wherein the second part of the ring nut comprises a radially inner threaded portion formed at an axially outer end of the second part of the ring nut. This arrangement allows a coupling to be made by mutual screwing, in a constructively very simple manner.

Preferably, the second part of the ring nut comprises an inner flange, projecting radially, which is in abutment against an axially inner face of the first part of the ring nut. The provision of this abutment ensures the perfect mutual positioning of the two parts of the ring nut.

Preferably, the second part of the ring nut is not in contact with the monolithic set, where the axially outer face of the second part of the ring nut and the flange of the ring nut form an annular seat for receiving the monolithic set that leaves the monolithic set free to rotate with respect to the ring nut. In this way, the coupling condition between the monolithic set and the ring nut is ensured in a simple and secure manner, wherein they are free to rotate with respect to one another, even in the presence of a mutual constraint in the axial direction.

Preferably, the smallest sprocket of the monolithic set has 9 teeth. Such a small number of teeth, the mounting of which on the sprocket-carrying body is made possible by the monolithic set, makes it possible to use the sub-assembly in a transmission in which the front crankset has smaller crowns, whilst still allowing the same gear ratios to be obtained with all other conditions being the same.

In a second aspect of the invention, the method for fixing a cogset to a sprocket-carrying body through a ring nut, wherein the cogset comprises a plurality of axially adjacent sprockets between a first sprocket having minimum number of teeth and a last sprocket having maximum number of teeth, wherein at least the first three sprockets are fixedly connected to one another so as to form a monolithic set with an axial through opening in which—in at least one axially inner portion thereof—a coupling profile is formed, comprises the steps of:

inserting all of the sprockets not forming part of the monolithic set on the sprocket-carrying body, ensuring a shape coupling between the sprockets and the sprocket-carrying body, constraining the ring nut to the monolithic set only in the axial direction, leaving it free to rotate with respect to the monolithic set, making the coupling profile formed in the axial through opening of the monolithic set engage on a corresponding coupling profile formed on the radially peripheral surface of the sprocket-carrying body, screwing a radially peripheral threaded portion formed at an axially inner end of the ring nut to a radially inner threaded portion of the sprocket-carrying body, until a radially peripheral flange formed at an axially outer end of the ring nut is made to clamp axially in abutment against an axially outer face of the monolithic set.

The aforementioned steps can be carried out in the indicated order or in a different order; for example, the ring nut can be coupled with the monolithic set before the insertion of the largest sprockets on the sprocket-carrying body.

This method makes it possible to best exploit the features of a sub-assembly according to the invention.

Preferably, the step of constraining the ring nut to the monolithic set comprises forming the ring nut in two parts—an axially outer first part on which the flange is formed and an axially inner second part on which the threaded portion of the ring nut is formed, and assembling together the two parts of the ring nut, inserting them from opposite directions in the opening of the monolithic set. This allows easy assembly of the ring nut.

Preferably, the first part of the ring nut comprises a radially peripheral threaded portion formed at an axially inner end of the first part of the ring nut, and the second part of the ring nut comprises a radially inner threaded portion formed at an axially outer end of the second part of the ring nut, wherein the step of assembling the ring nut comprises screwing together the two parts of the ring nut. These features also allow easy assembly of the ring nut.

Preferably, the step of assembling the ring nut comprises forcing a radially inner flange of the second part of the ring nut against an axially inner face of the first part of the ring nut. This simple operation allows the ring nut to be made in a simple manner, ensuring the necessary overall solidity.

More in particular, with reference to the third aspect of the invention, the ring nut is formed in two parts assembled together—an axially outer first part on which a tubular body and a flange are formed, the flange being in a radially peripheral position at an axially outer end of the ring nut, and an axially inner second part on which a threaded portion of the ring nut is formed, the threaded portion being in a radially peripheral position at an axially inner end of the ring nut; the threaded portion is adapted to be coupled in screwing engagement with a radially inner threaded portion of a sprocket-carrying body.

As already stated, the structure in two parts allows simple and effective coupling of the ring nut with the monolithic set: the two parts can be partially inserted in the axial through opening of the monolithic set from opposite directions and thus be coupled by closing together the monolithic set.

Preferably, the threaded portion of the ring nut has a core diameter greater than the outer diameter of the tubular body. In this way, the threaded portion cooperates with the flange, ensuring the desired constraint to the monolithic set: freedom of rotation and prevention of sliding in the axial direction.

Preferably, the first and the second part of the ring nut are screwed together. This allows easy assembly of the ring nut.

Preferably, the first part of the ring nut comprises a radially peripheral threaded portion formed at an axially inner end of the first part of the ring nut, and wherein the second part of the ring nut comprises a radially inner threaded portion formed at an axially outer end of the second part of the ring nut. These features also allow easy assembly of the ring nut.

Preferably, the second part of the ring nut comprises an inner flange, projecting radially, which is in abutment against an axially inner face of the first part of the ring nut. This feature makes it possible to assemble the ring nut in a simple manner, ensuring the necessary overall solidity.

Preferably, an axially outer face of the second part of the ring nut and the flange of the ring nut form an annular seat adapted for receiving the monolithic set so that the monolithic set remains free to rotate with respect to the ring nut. In this way, the ring nut allows the coupling condition with a monolithic set to be made in a simple and secure manner, wherein ring nut and monolithic set are free to rotate with respect to one another, even in the presence of a mutual constraint in the axial direction.

With reference to the figures, there is represented a hub group 1 of a bicycle rear wheel (not shown), with a hub 10 extending according to a rotation axis X and coaxially mounted on a pin 11, by means of bearings 12; the hub 10 is thus free to rotate on the pin 11, whereas the latter is intended to be mounted fixed on the frame of the bicycle. The hub 10 must be understood to be representative of any hub and will be described only insofar as what is of interest for the purposes of the present invention, thus disregarding the features that are not in relation to the present invention.

The hub 10 is coupled with a sprocket-carrying body 14, through a free wheel mechanism (not highlighted in the drawings) that ensures that the hub 10 is set in rotation by the sprocket-carrying body 14 only in the direction that determines forward motion of the bicycle, not in the opposite direction. The sprocket-carrying body 14 has an approximately tubular shape and is mounted free on the pin 11, by means of bearings 15. The sprocket-carrying body 14 is provided on the radially peripheral surface thereof with grooves 17 extending in the axial direction; these grooves 17 form a shape coupling profile on the sprocket-carrying body 14. Moreover, the sprocket-carrying body 14 is provided, close to the axially inner end thereof, with an end stop 18, in the form of a flange, extending along the entire circumference of the sprocket-carrying body 14.

Figure 4:
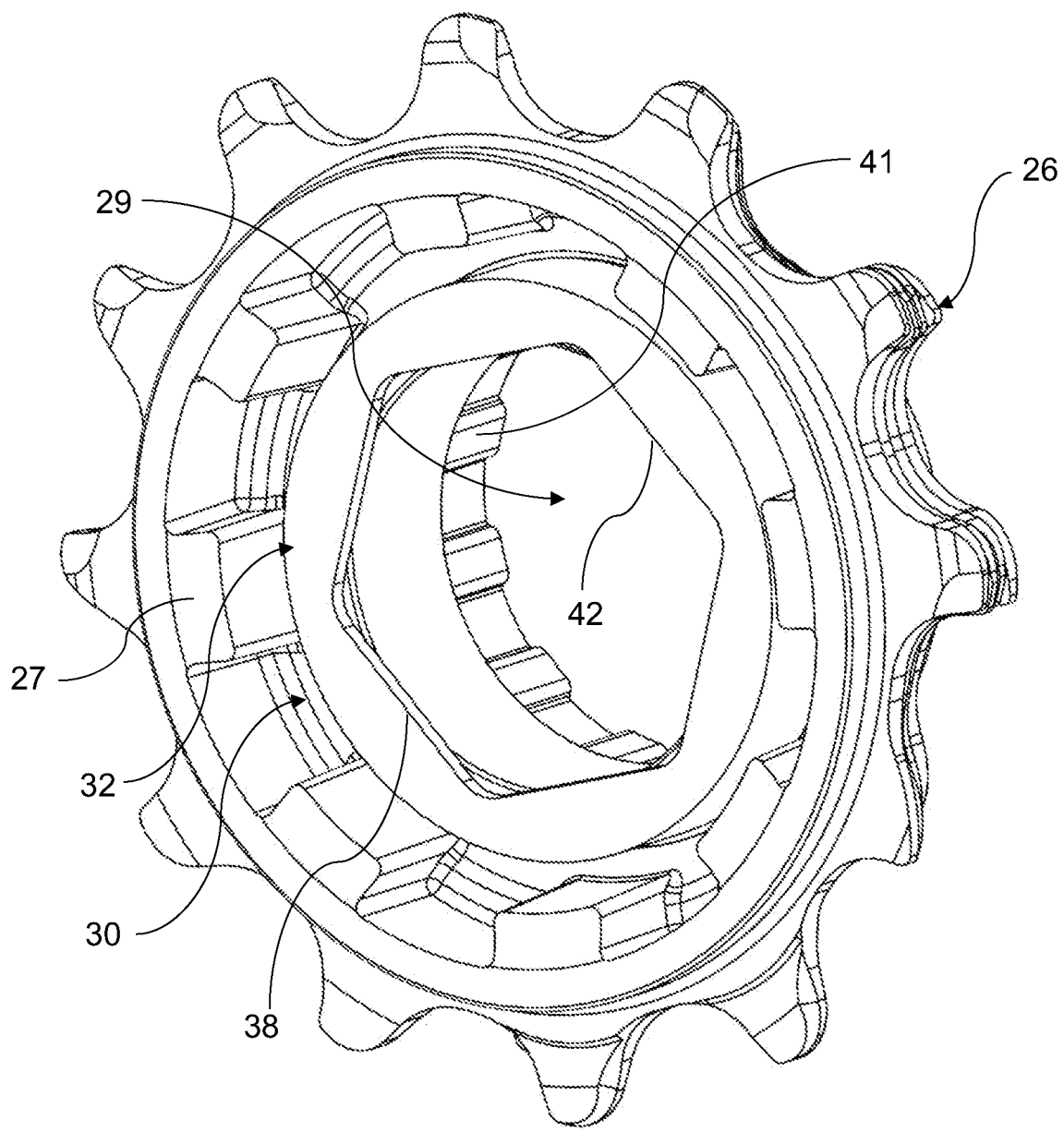
FIG. 4 is a perspective view of the monolithic set and of the ring nut of the sub-assembly shown in FIG. 1.
Figure 5:
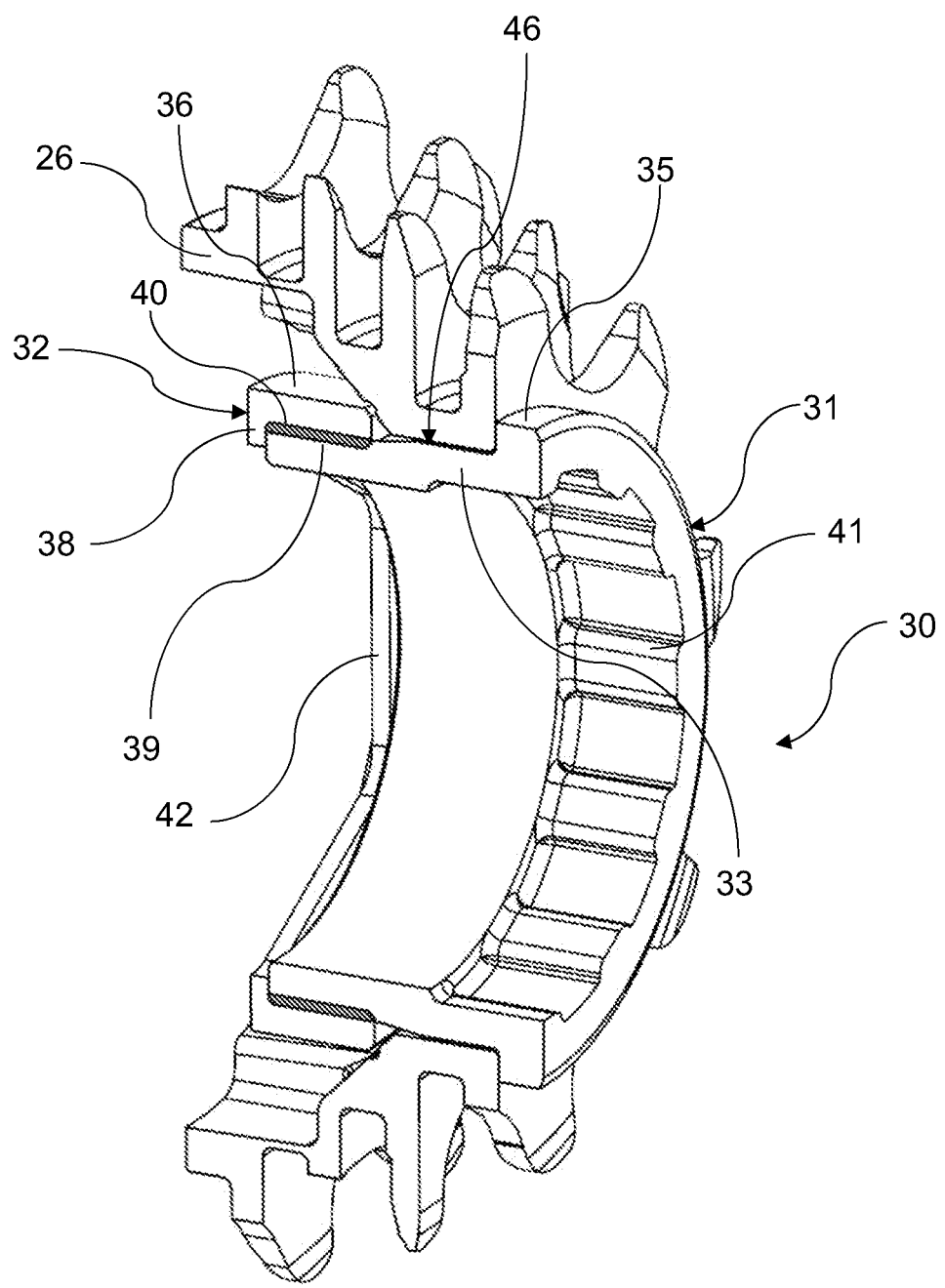
FIG. 5 is a perspective section view of the monolithic set and of the ring nut shown in FIG. 4.

A cogset 20 is mounted on the sprocket-carrying body 14. The cogset 20 comprises 13 sprockets organized from the largest to the smallest as follows: the first three sprockets 21a, 21b, 21c are made fixedly connected to one another to form a monolithic set (or triplet) 21; the next three sprockets 22, 23, 24 are independent from one another; the next three sprockets 25a, 25b, 25c are made fixedly connected to one another to form a monolithic set (or triplet) 25; the last four sprockets 26a, 26b, 26c, 26d are made fixedly connected to one another to form a monolithic set (or quadruplet) 26. These elements are mounted peripherally on the sprocket-carrying body 14, with the triplet 21 resting axially at the end stop 18, the sprocket 22 resting axially at the triplet 21, the sprocket 23 resting axially at the sprocket 22, the sprocket 24 resting axially at the sprocket 23, the triplet 25 resting axially at the sprocket 24, the quadruplet 26 resting axially at the triplet 25. The triplets 21, 25, the quadruplet 26 and the sprockets 22-24 have a shaped central opening, with radial projections 27 of matching shape to the section of the grooves 17 on the sprocket-carrying body 14; these radial projections 27—visible in FIG. 4 in relation to the monolithic set 26—form a shape coupling profile with the grooves 17 in the monolithic set 26.

More precisely, the monolithic set 26 has an axial through opening 29 that crosses the entire monolithic set 26. The radial projections 27 in the monolithic set 26 only engage the innermost axial portion, in practice only at the sprocket 26a, whereas the axially outermost portion of the opening 29 has a smaller diameter, due to the smaller number of teeth present on the sprockets 26b, 26c and 26d.

The triplets 21, 25, the quadruplet 26 and the sprockets 22-24 are slotted on the sprocket-carrying body 14, constrained in rotation to the sprocket-carrying body 14 by means of the projections 27 engaged in the grooves 17 but substantially free in the axial direction. Towards the inside in the axial direction (i.e. towards the hub 10), the triplets 21, 25, the quadruplet 26 and the sprockets 22-24 are held by the end stop 18; towards the outside in the axial direction, the triplets 21, 25, the quadruplet 26 and the sprockets 22-24 are held by a fixing element, formed by a ring nut 30.

The ring nut 30 is made in two parts assembled together, an axially outer first part 31 and an axially inner second part 32. The first part 31 of the ring nut 30 comprises a tubular body 33 on which a flange 35 is formed, radially peripheral and projecting radially with respect to the tubular body 33; the flange 35 is at an axially outer end of the ring nut 30. The second part 32 of the ring nut 30 comprises a tubular body 34 on which a radially peripheral threaded portion 36 is formed and an inner flange 38, projecting radially from the tubular body 34 towards the rotation axis X; both the threaded portion 36, and the inner flange 38 are at the axially inner end of the second part 32 of the ring nut 30.

The first part 31 of the ring nut 30 also comprises a radially peripheral threaded portion 39 formed at an axially inner end of the first part 31 itself of the ring nut 30. The second part 32 of the ring nut 30 in turn comprises a radially inner threaded portion 40 formed at an axially outer end of the second part 32 itself of the ring nut 30.

The first part 31 and the second part 32 of the ring nut 30 are assembled together through screwing engagement of the threaded portion 39 with the threaded portion 40, until the inner flange 38 is brought into abutment against the axially inner face of the first part 31 of the ring nut 30. In this way, the axially outer face of the second part 32 of the ring nut 30 and the flange 35 of the first part 31 of the ring nut 30 form an annular seat 46 for receiving the monolithic set 26. In this annular seat 46, the monolithic set 26 is free to rotate with respect to the ring nut 30, but not to move axially with respect to it; indeed, both the flange 35 of the first part 31, and the threaded portion 36 of the second part 32, have a greater diameter both than the minimum diameter of the opening 29 of the monolithic set 26, and than the diameter of the tubular body 33 of the first part 31 of the ring nut 30. The diameter of the tubular body 33 of the first part 31 of the ring nut 30 is slightly smaller than the minimum diameter of the opening 29, so as to allow the mutual rotation between the ring nut 30 and the monolithic set 26. More precisely, the threaded portion 36 of the second part 32 of the ring nut 30 has a core diameter greater than the diameter of the tubular body 33 of the first part 31 of the ring nut 30.

The tubular body 33 of the first part 31 of the ring nut 30 is internally shaped with a toothing 41, which forms a coupling profile suitable for a tightening tool (not shown) of matching shape.

The inner flange 38, arranged at the axially inner face of the second part 32 of the ring nut 30, comprises an inner opening 42, shaped so as to form a coupling profile suitable for a tightening tool (not shown) of matching shape. In the illustrated example, the shape of the opening 42 is hexagonal.

The sprocket-carrying body 14 is provided with a threaded portion 16, formed in radially inner position at the outer end of the sprocket-carrying body 14. This threaded portion 16 is engaged through screwing by the radially peripheral threaded portion 36 of the second part 32 of the ring nut 30, thus making it possible to constrain the ring nut 30 to the sprocket-carrying body 14, bringing the flange 35 into abutment against an axially outer face of the monolithic set 26, so as to axially block the monolithic set 26 and all of the sprockets of the cogset 20 on the sprocket-carrying body 14.

According to the invention, the fixing of the cogset 20 to the sprocket-carrying body 14 through the ring nut 30 can take place in the following way.

In one step, the sprockets 21-25 (single or grouped in monolithic sets) are axially inserted on the sprocket-carrying body 14, sending them in abutment one after the other, the first (i.e. the largest sprocket) against the end stop 18, the other following one against the other; only the monolithic set 26 that groups together the smallest sprockets is not inserted. In this step, the sprockets 21-25 are coupled with the sprocket-carrying body 14 so as to rotate as a unit with it, in a per se conventional manner, thanks to the engagement of the projections 27 in the grooves 17.

In another step (which can precede or follow the one just described), the monolithic set 26 is associated with the ring nut 20. For this purpose, the first part 31 is inserted in the axial through opening 29 of the monolithic set 26 in an axial direction from the outside towards the inside, whereas the second part 32 is inserted in the same opening 29 in an axial direction from the inside towards the outside. The two parts 31 and 32 of the ring nut 30 thus meet inside the opening 29 and can be screwed together, by means of the respective threaded portions 39 and 40. More precisely, the two parts 31 and 32 can be clamped together with suitable tools engaged in the toothing 41 and in the opening 42, so as to clamp the inner flange 38 of the second part 32 against the axially inner face of the first part 31. The monolithic set 26 remains enclosed between the two parts 31 and 32 of the ring nut 30, free to rotate in the annular seat 46.

After these two steps, the assembly of the monolithic set 26 and the ring nut 30 is mounted on the sprocket-carrying body 14. Firstly, it is inserted axially, from the outside towards the inside, so as to obtain the shape coupling of the projections 27 in the grooves 17, thus in an analogous manner to what is done for the other sprockets of the cogset 20. Once thus inserted, the monolithic set 26 has the threaded portion 36 of the ring nut 30 ready for screwing engagement with the threaded portion 16 of the sprocket-carrying body 14. At this point, the ring nut 30 is thus screwed to the sprocket-carrying body 14, set in rotation by a suitable tool engaged in the toothing 41; during this actuation, the ring nut 30—even if made in two parts 31 and 32—remains monolithic, since the clamping torque applied on the toothing 41 to screw the ring nut 30 to the sprocket-carrying body 14 tends to further consolidate the screwing between the threaded portions 39 and 40 of the two parts 31 and 32.

With this operation, the flange 35 of the ring nut 30 is brought to clamp against the axially outer face of the monolithic set 26, in this way obtaining the locking in the axial direction of all of the sprockets 21-26 on the sprocket-carrying body 14. During this clamping, the monolithic set 26 is not in contact with the second part 32 of the ring nut 30, but only with the first part 31. The axially outer face of the second part 32 of the ring nut 30 and the flange 35 of the ring nut 30 form an annular seat 46 for receiving the monolithic set 26 that leaves the monolithic set 26 free to rotate with respect to the ring nut 30.

It should be noted that thanks to the invention it is possible to mount the monolithic set 26 on a normal sprocket-carrying body 14 even if the smallest sprocket 26d thereof is so small (9 teeth or even less) that the diameter of the axial through opening 29 does not allow the passage of a conventional ring nut suitable for engaging with the sprocket-carrying body 14; the ring nut 30 indeed has a threaded portion 36 of greater diameter (core diameter) than the minimum diameter of the axial through opening 29 and manages to couple with the threaded portion 16 of the sprocket-carrying body 14.

What is claimed is:

1. A sub-assembly for a bicycle rear wheel, comprising:
   a sprocket-carrying body equipped with a radially inner threaded portion at an axially outer end thereof;
   a cogset coaxially mounted on the sprocket-carrying body,
   wherein the cogset comprises a plurality of axially adjacent sprockets between a first sprocket having a minimum number of teeth and a last sprocket having a maximum number of teeth,
   wherein at least the first three sprockets are fixedly connected to one another so as to form a monolithic set with an axial through opening which—in at least one axially inner portion thereof—a coupling profile is formed in shape engagement on a corresponding coupling profile formed on a radially peripheral surface of the sprocket-carrying body;
   a fixing element for axially fixing the monolithic set to the sprocket-carrying body, said fixing element comprising
   a ring nut comprises a flange that is radially peripheral to an axially outer end of the ring nut, a radially peripheral threaded portion at an axially inner end of the ring nut for, in screwing engagement with the radially inner threaded portion of the sprocket-carrying body, and a tubular body positioned between the flange and the radially peripheral threaded portion,
   wherein the flange abuts against an axially outer face of the monolithic set and the monolithic set is axially constrained by the ring flange while the monolithic set remains free to rotate about the tubular body of the ring nut.

2. The sub-assembly according to claim 1, wherein the ring nut is formed in two parts that are assembled together, wherein a first of the two parts has an axially outer first portion on which the flange is formed, and a second of the two parts has an axially inner second portion on which the threaded portion of the ring nut is formed.

3. The sub-assembly according to claim 2, wherein the first part and the second part of the ring nut are screwed together.

4. The sub-assembly according to claim 3, wherein the second part comprises, on an axially inner face thereof, a coupling profile to mate with a tightening tool.

5. The sub-assembly according to claim 3, wherein the first part of the ring nut comprises a radially peripheral threaded portion formed at an axially inner end of the first part of the ring nut, and wherein the second part of the ring nut comprises a radially inner threaded portion formed at an axially outer end of the second part of the ring nut.

6. The sub-assembly according to claim 5, wherein the second part of the ring nut comprises an inner flange, projecting radially, which is in abutment against an axially inner face of the first part of the ring nut.

7. The sub-assembly according to claim 6, wherein the second part of the ring nut is free of contact with the monolithic set, wherein the axially outer face of the second part of the ring nut and the flange of the ring nut form an annular seat that receives the monolithic set with the monolithic set remaining free to rotate with respect to the ring nut.

8. A method for fixing a cogset to a sprocket-carrying body, the method comprising the steps of:
   providing a cogset comprised of a plurality of axially adjacent sprockets with a first sprocket having a minimum number of teeth and a last sprocket having a maximum number of teeth, wherein the first sprocket and at least two adjacent sprockets are fixedly connected in a monolithic set with an axial through opening in which at least one axially inner portion thereof is a coupling profile, and
   inserting a remainder of the sprockets of the plurality of axially adjacent sprockets that are separate from the monolithic set onto the sprocket-carrying body and ensuring a shaped coupling between the sprockets and the sprocket-carrying body;
   providing a ring nut comprising a flange that is radially peripheral to an axially outer end of the ring nut, a radially peripheral threaded portion at an axially inner end of the ring nut is configured for engagement with a radially inner threaded portion of the sprocket-carrying body, and a tubular body positioned between the flange and the radially peripheral threaded portion,
   applying the ring nut to the monolithic set in the axial direction and leaving the ring nut free to rotate with respect to the monolithic set;
   engaging the coupling profile in the axial through opening of the monolithic set on a corresponding coupling profile formed on a radially peripheral surface of the sprocket-carrying body;
   screwing the radially peripheral threaded portion formed at an axially inner end of the ring nut to the radially inner threaded portion of the sprocket-carrying body so the flange abuts against an axially outer face of the monolithic set and the monolithic set is axially constrained by the ring flange while the monolithic set remains free to rotate about the tubular body of the ring nut.

9. The method according to claim 8, wherein the step of applying the ring nut to the monolithic set comprises:
   forming the ring nut in two parts wherein a first part is an axially outer first part on which the flange is formed, and a second part is an axially inner second part on which the threaded portion of the ring nut is formed; and,
   inserting the two parts of the ring nut from opposite directions into the axial through opening of the monolithic set and assembling the two parts of the ring nut together.

10. The method according to claim 9, wherein the first part of the ring nut comprises a radially peripheral threaded portion formed at an axially inner end of the first part of the ring nut, and wherein the second part of the ring nut comprises a radially inner threaded portion formed at an axially outer end of the second part of the ring nut, and assembling the ring nut by screwing together the two parts of the ring nut.

11. The method according to claim 10, wherein the step of assembling the ring nut comprises forcing a radially inner flange of the second part of the ring nut against an axially inner face of the first part of the ring nut.

12. A ring nut for fixing a cogset to a sprocket-carrying body having a rotation axis, the ring nut comprising:
- a first part having a tubular body that is centered with the rotation axis of a sprocket-carrying body, the first part comprising a radially peripheral flange formed on the tubular body of the first part at an axially outer end thereof, and radially peripheral threads formed on the tubular body of the first part at an axial inner end thereof;

and,
- a second part having a tubular body having radially peripheral threads formed at an axial inner end of the tubular body of the second part;
- wherein the peripheral flange of the first part of the ring nut abuts against an axially outer face of a cogset and constrains the cogset axially while the cogset remains free to rotate about the tubular body of the first part.

13. The ring nut according to claim 12, wherein the threaded portion of the ring nut has a core diameter greater than an outer diameter of the tubular body having radially peripheral threads.

14. The ring nut according to claim 12, wherein the first and the second part of the ring nut are screwed together.

15. The ring nut according to claim 14, wherein an axially outer face of the second part of the ring nut and the flange of the ring nut form an annular seat adapted for receiving the monolithic set so that the monolithic set remains free to rotate with respect to the ring nut.

* * * * *